H. BERKSTRESSER.
Rotary Cultivator.
No. 68,689.
Patented Sept. 10, 1867.
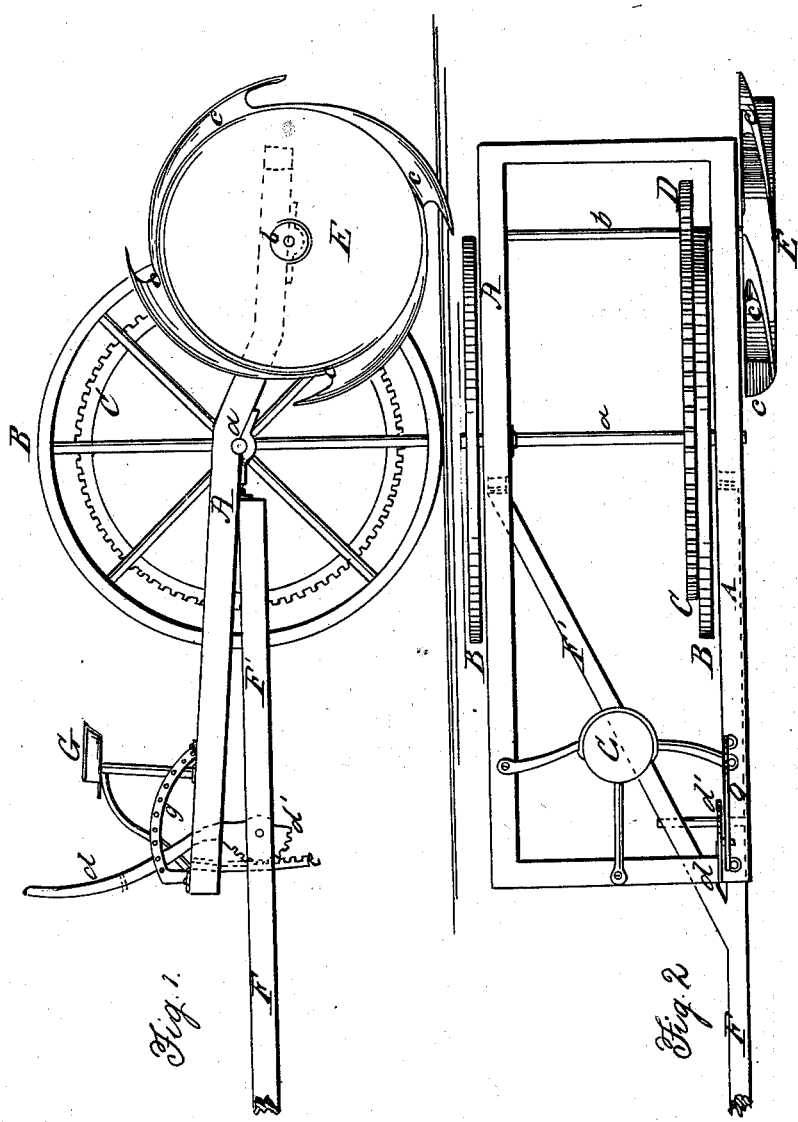

United States Patent Office.

HENRY BERKSTRESSER, OF QUAKER BOTTOM, OHIO.

Letters Patent No. 68,689, dated September 10, 1867.

IMPROVEMENT IN ROTARY PLOUGH.

*The Schedule referred to in these Letters Patent and making part of the same.*

TO ALL WHOM IT MAY CONCERN:

Be it known that I, HENRY BERKSTRESSER, of Quaker Bottom, in the county of Lawrence, and State of Ohio, have invented a new and improved Rotary Plough; and I do hereby declare that the following is a full, clear, and exact description thereof, which will enable others skilled in the art to make and use the same, reference being had to the accompanying drawings, forming part of this specification, in which—

Figure 1 is a side elevation of my invention.

Figure 2 is a top view.

Similar letters of reference indicate like parts.

This invention relates to an improved rotating plough, and consists in placing several ploughs with their mould-boards on one side, upon the periphery of a wheel which is mounted on a truck-frame and connected by gear with driving-wheels attached to the truck-frame or carriage in such manner that the wheel with the ploughs shall revolve and open a furrow by the successive penetration of the ploughs into the ground. The furrow thus formed by the rotary ploughs will be made around a field, commencing with the circumference or outside, and working to the middle, in the same manner that a reaper works, which method keeps the team on the solid unploughed land in the whole operation of ploughing a field. The ploughs are adjusted to any depth by the driver seated on the carriage, and may be lifted clear of the ground, for moving about from place to place.

A represents a truck-frame, on which are mounted two wheels B B on the axle $a$. On the inner side of one of the wheels is secured a concentric cog-wheel, C, which gears into a pinion, D, hung on the shaft $b$, placed in the rear of the carriage. On one end of the shaft $b$, outside of the frame, is secured a strong wheel, E, made of any suitable material, on the periphery of which wheel are fitted four ploughs $c$ $c$, more or less. These ploughs are made of iron or steel, of any good pattern, of mould-boards, which are set to face outward, so that the land-side is towards the carriage. The ploughs should be made as light as possible, and the points strong, and secured by bolts in the usual way.

The draught-pole F is connected with both sides of the frame by forks F' F', which are hinged to the under side of the side-beams, just forward of the axle, so that the frame A can be tilted on the axle $a$, or raised and lowered with the ploughs, while the draught-pole is kept level to the team. This movement is designed to regulate the depth of the ploughs in working, and to lift them off the ground entirely when desired; and it is effected by means of a hand-lever, $d$, pivoted to the frame near the driver's seat G, which may be placed either on the front or rear part of the carriage. One end of the lever $d$ is a toothed segment, $d'$, which engages in a rack, $e$, fastened on the draught-pole F, and a holding-guide, $g$, is provided for securing the lever in any required position.

It will be seen that with this arrangement the wheel E, with the ploughs attached, can be depressed or elevated at will by the driver, and that the movement of the driving-wheels B B will rotate the wheel E, and thus operate the ploughs, so that they will enter the ground in quick succession, and make a furrow, while the team will travel on the unploughed land.

Having thus described my invention, what I claim as new, and desire to secure by Letters Patent, is—

1. The ploughs $c$ $c$, fitted upon the periphery of the wheel E, constructed and arranged as shown and described, as and for the purpose specified.

2. The combination of the wheel E with the tilting-frame A, the draught-pole F, and the lever $d$, arranged and operating substantially as and for the purposes set forth.

HENRY BERKSTRESSER.

Witnesses:
STEPHEN STALEY,
SALEM SHAW.